Feb. 24, 1942.      W. A. SWAN      2,274,619
VEHICLE ROCKING DEVICE
Filed April 22, 1938      4 Sheets-Sheet 4
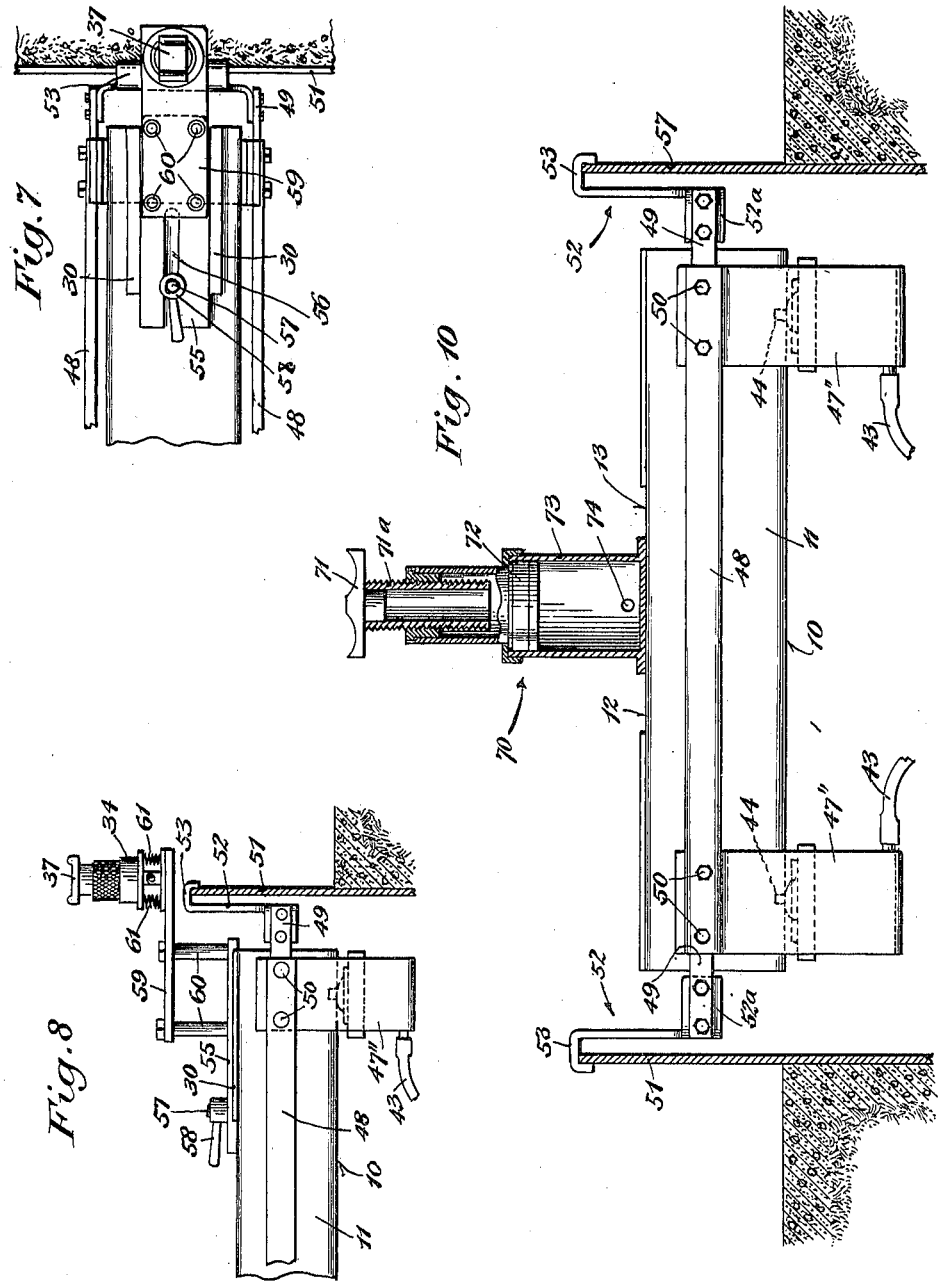
INVENTOR
Willis A. Swan,
BY
ATTORNEY Patented Feb. 24, 1942

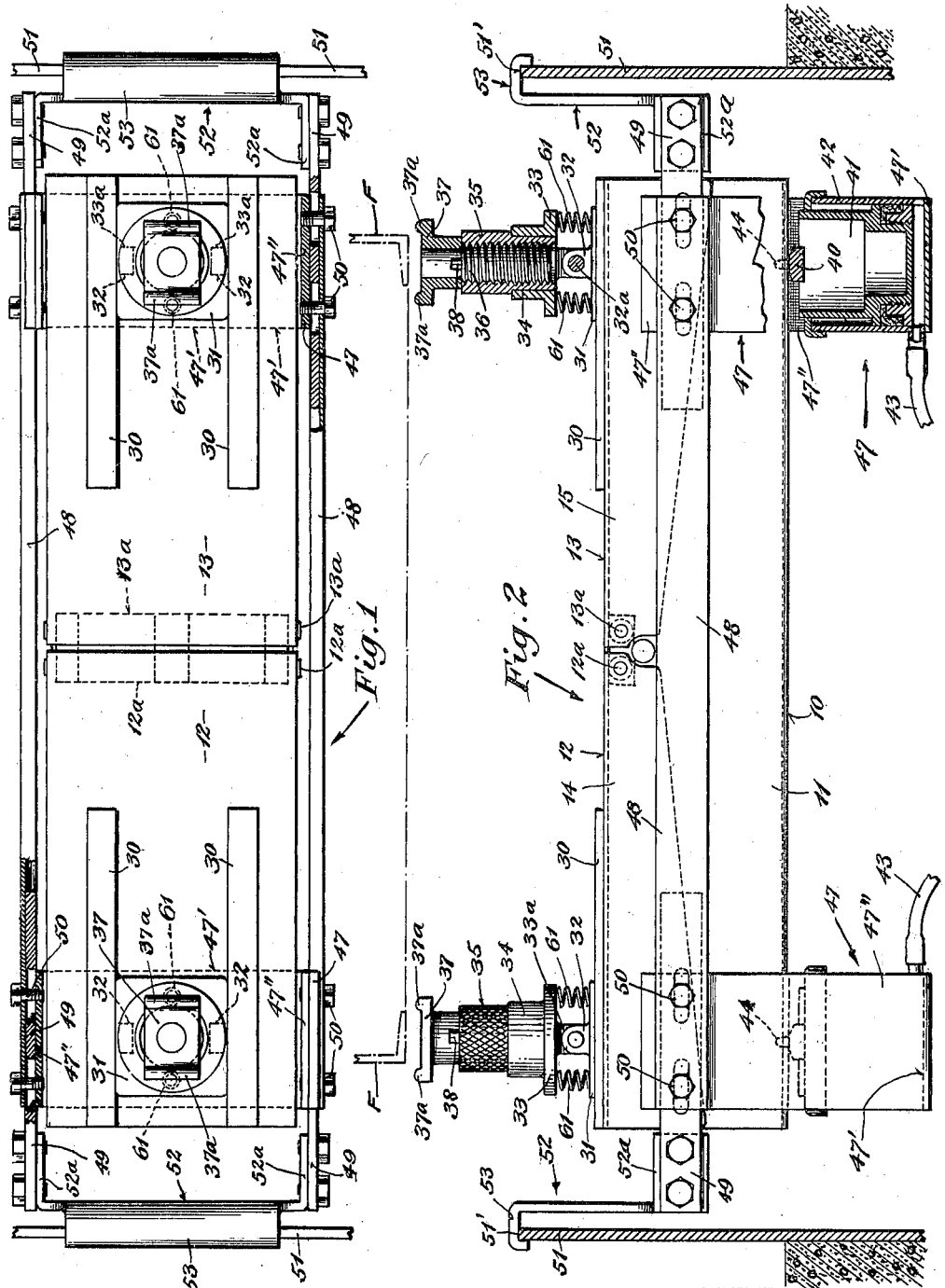

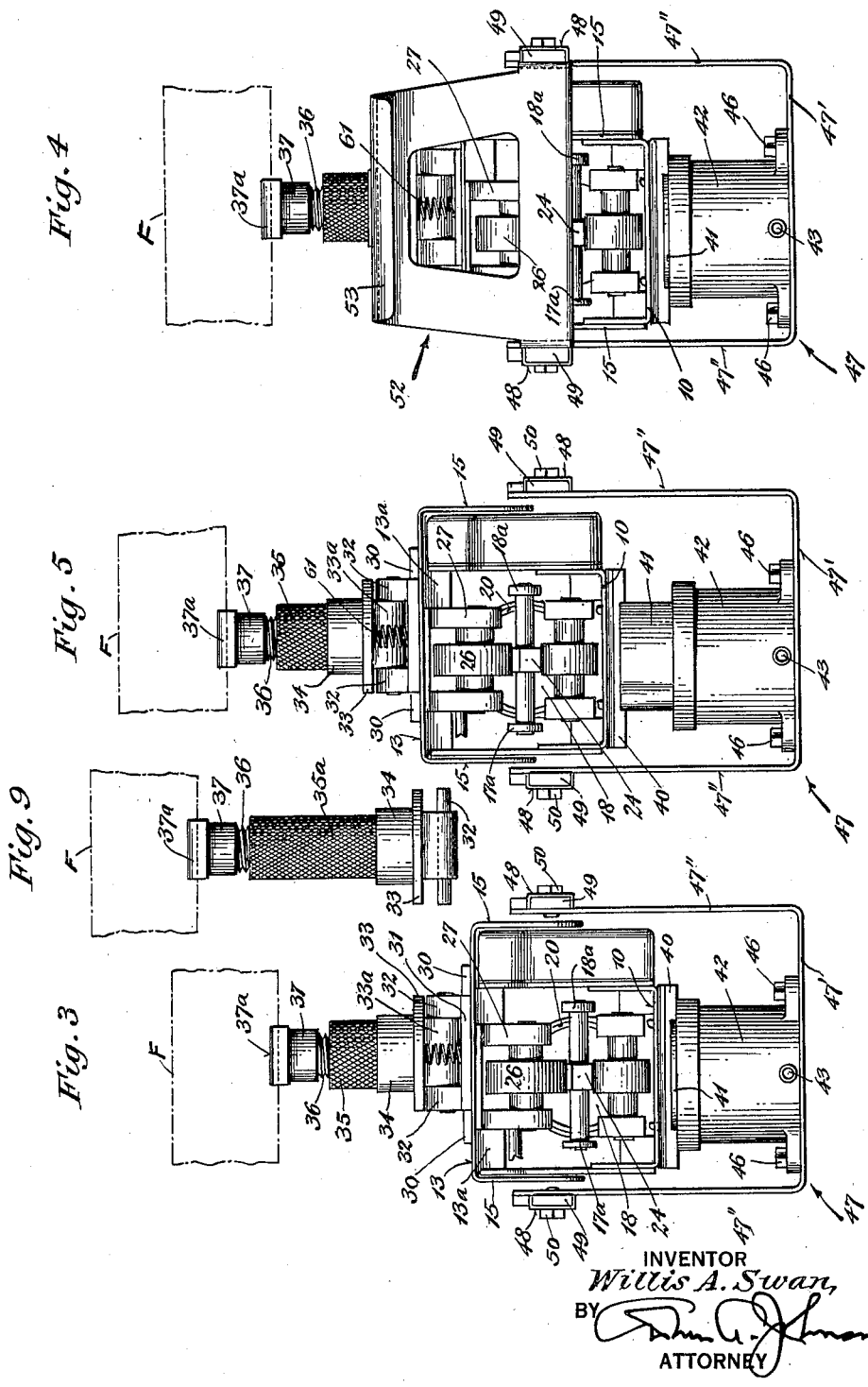

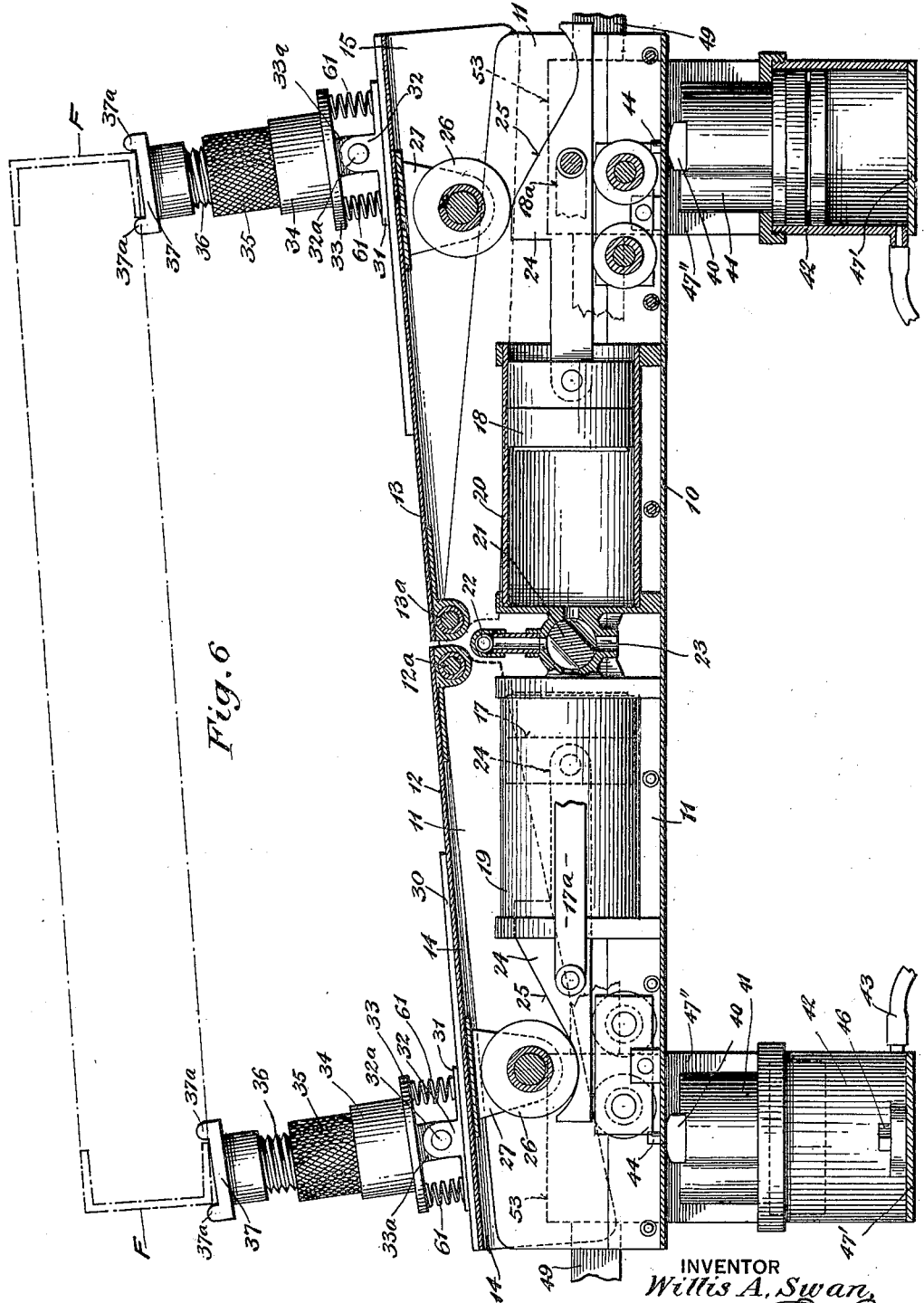

2,274,619

UNITED STATES PATENT OFFICE 2,274,619

VEHICLE ROCKING DEVICE

Willis A. Swan, Bridgeport, Conn., assignor to Arthur A. Johnson, Bridgeport, Conn.

Application April 22, 1938, Serial No. 203,623

11 Claims. (Cl. 73—51)

This invention relates to mechanism for raising and rocking automotive vehicles while they are being serviced with grease, oil, etc.

In general practice, the vehicle to be thus serviced at service stations, is run onto a service-rack into such a position that an attendant may have free access to all parts which are to be inspected, repaired, adjusted, and lubricated. In many instances, for example, it is necessary to locate squeaks or loose joints in the body or framing, and, when found, to remedy the fault by either tightening the offending parts or by lubricating them, as the case may require. To detect these squeaks, one attendant is usually required to shake or rock the vehicle, in imitation of the conditions existing when traveling on the road while another attendant locates the parts requiring attention to remedy those squeaks or rattles.

In my copending application, S. N. 162,463, there is shown and described a car-rocking device which requires the services of only one attendant, who at first controls the device as to its frequency of rocking operations which then becomes automatic inaction, and leaves him free to attend to the parts to be taken care of.

The present invention deals more particularly with the means for raising the car frame and body to be serviced, without necessarily lifting the wheels from the ground, but so that the car springs will be relieved from all tension and lateral rocking movement of the body and car frame will, therefore, be greatly facilitated and can be accomplished without bumping. With that object in view, the invention provides supporting means for primarily only contacting the underside of the side frames of the car, regardless of their altitude above the ground, such contacts being effected by jacking members which are resting on the car-rocking mechanism proper and are easily and quickly adjustable by hand, to have their upper ends contacting the car frames without, however, raising them with their load. These contacts can be independently established, even if one car frame is lower than the other for some reason or other, it being understood, of course, that the jacking members rest on the car-rocking mechanism or unit when the latter is normally at low level and ready to receive a car to be serviced.

Inasmuch as practice has demonstrated that, when a car is rocked or tilted from one side to the other to the limit, there is a tendency for the car to sway to some extent in addition to the tilt, due to the momentum of its sidewise movement to the right or left, this sway creating a possibility of the frame slipping sidewise of the jack-top, or moving the jack bodily on its support.

The present invention, therefore, provides means for permitting this sway without liability of disarranging the positions of the jacks on their supports, these means being preferably resilient and yielding, and also tending to cause the jacks to reassume their normally vertical conditions.

In my copending application above referred to, the car-rocking mechanism constitutes a self-contained unit which extends across a suitable pit and is directly supported by a pair of rails disposed along the side walls of the pit. This implies that the unit, per se, never rises or falls relatively to the level of the pin rails, and that, consequently, the jacks carried by the unit must be adjusted to not only compensate for any variation in the levels of the car frames, but, in addition thereto, to raise the frames high enough to allow for the rocking or teetering movement of the car, a proceeding requiring considerable time and being rather uncertain as to the results obtained.

The present invention, shown here as including the rocking unit mentioned, comprises elevator means for lifting the unit bodily and sufficiently high to permit free rocking movement to the car supported by the jacks, these elevator means preferably being pneumatically operable, either individually or jointly, and being supported on a cross-bar which extends across the pit and may be positioned longitudinally thereof on the side rails provided for that purpose.

Further features of the invention will be apparent from the specification, taken in connection with the drawings, in which:

Figure 1 is a plan view of my improved mechanism, complete.

Fig. 2 is a side view thereof.

Fig. 3 shows an end view of the same without the rail-engaging hooks, the rocking mechanism being in its lowermost position, while the jack illustrated is shown as having been adjusted to contact the underside of the car frame.

Fig. 4 shows a complete end view.

Fig. 5 illustrates the elevator mechanism at the limit of its upward movement.

Fig. 6 is a longitudinal section of the car-rocking mechanism extending across the pit, the right-hand end of the teeter being in its high limit, while the left-hand is in its lowermost position, and the elevators are "up."

Fig. 7 is a plan view showing the car-engaging jack as being carried on an extension beyond the pit rail.

Fig. 8 is a side view thereof.

Fig. 9 is a modification of the jacking device.

Fig. 10 shows another modification, in which the end jacks of the unit have been supplanted by a substantially centrally-disposed pneumatic support adapted to engage the underside of the differential casing or the axles of a car, instead of its side frames, for tire-changing purposes.

Inasmuch as the car-rocking unit incorporated in the present invention is precisely the same as that of my copending application above-mentioned, and its particular construction of its mechanical details is unimportant, a general brief statement regarding its operation may be considered sufficient to bring it into functional relation with the elements of the present invention. Referring to Fig. 6, the car-rocking unit comprises a box-like structure having a horizontal bottom plate 10 and a pair of vertical side walls 11, between which the operative rocking devices are located, both ends of the substantially U-shaped unit box being open. Pivoted to the central portions of the side walls near the upper edges thereof, as at 12a and 13a, are a pair of tiltable cover plates 12 and 13 straddling the side walls 11 and having pairs of stiffening aprons 14, 15 respectively. The cover plates constitute, when swung vertically around their respective pivots 12a, 13a, a teeter which carries the jacking members for the car frames, diagrammatically shown at F; it being understood, of course, that, in order to produce the rocking movement of the car, the free end of one cover plate moves upwardly while the free end of the other cover plate moved downwardly, and vice versa. This result is obtained by a pair of pistons 17, 18 coupled by bars 17a, 18a, and movable in horizontal cylinders 19, 20 into which pressure air is alternately admitted automatically through a four-way plug valve 21, from a supply pipe 22 and, as here shown, into the left cylinder 19 while the right cylinder 20 is free to exhaust through the exhaust port 23.

Each piston has a connecting rod 24 projecting through the open end of its cylinder and having at its outer end an inclined or cam face 25 engaging and acting upon a roller 26 which is supported in a bracket 27 firmly secured to the underside of its particular cover section 12 or 13, respectively. As here shown, the free end of cover 12 is down while that of cover 13 is up, and the car frames are in corresponding positions, which means that the car is rocked to the limit of its left-tilt movement.

This condition will naturally be reversed by the simultaneous movement of both pistons toward the left.

Referring now to the jacking mechanism whereby the side frames of the car are supported on the teeter covers 12, 13 in accordance with my present invention (see Figs. 1 and 2) it will be noted that the upper face of each cover has a pair of retainer strips 30 between which a jacking device may be held against displacement on the cover plate of the unit, but may be moved along and adjustably spaced from each other to come into vertical alignment with the car frame to be supported by it. In Fig. 2, the exemplary preferred construction of the jacking member comprises a base plate 31 fitted between the retainer strips 30 and resting on the upper face of the teeter plate 13. Pivoted by a pivot pin 32a to a central lug 32, which is attached to or forms a part of the base plate 31, is a rocker plate 33 provided at its underside with pivot ears 33a and having a hub 34 bored to receive the lower end of a nut sleeve 35 the upper portion of which is larger in diameter than that of the lower portion and, therefore, forms a shoulder which rests upon the upper face of the hub 34. The interior screw thread of the sleeve 35 is in engagement with a correspondingly threaded stud 36 whose upper end carries a shoe 37 provided with upwardly-projecting side flanges 37a adapted to receive between them one side frame F of the car to be serviced, the shoe 37 being removably but not rotatably attached to the upper end of the stud 36 so that another shoe may be substituted for the one shown, and also so that the stud may be held against rotation on the stud, as, for instance, by a key 38 when the nut sleeve 35 (whose outer surface may be knurled for hand manipulation) is rotated and therefore raises or lowers the nonrotatable stud 36 to effect contact between the upper face of shoe 37 and the underside of the car frame F, this organization holding the car frame rigidly in spaced relation to the teeter surface upon which the jack is supported.

In a similar manner, the other cover plate carries a second complete jacking member, so positioned that both side frames F of the car to be serviced are firmly contacted by their respective jacks.

One particular feature of the present invention is the provision of means which permit the jacking devices to (1) adapt themselves to different altitudes of car frames, and (2) to adjust themselves to different loads carried by the latter, in which case the frame carrying a heavier load than the other will naturally be depressed to be lower than its companion. In addition to these adaptabilities, the present jacking devices will act as shock absorbers at the end of each rocking movement of the car from one side to the other, especially when such rocking movement is terminated abruptly, as may be due to the rapidity of the reversing action, in which case the momentum attained by the car rocking might otherwise cause breakage of the, or slipping on the, jacking device.

Considering first the case when the car to be serviced is evenly balanced, viz: that both side frames are on a level then both jack shoes require the same altitude of contact with the side frames which, be it remembered, are parts of a thoroughly rigid frame of oblong structure which is reinforced or augmented in rigidity by the sill frame of the body, especially in larger trucks. After the frame-and-jack contacts have been established, elevator means are put into action to raise the entire rocker unit for a distance commensurate with the vertical rocking distance or swing of the car frame, and so that the wheels of the car will remain undisturbed, while the frame and body of the car are in free car-rocking position.

My present invention, therefore, comprises, as one of its features, the provision of preferably a pair of elevator devices, such as clearly shown in Fig. 6, in which the bottom plate 10 of the rocker unit rests upon a pair of bars 40, each of which is carried at the top of an elevator plunger or piston 41 vertically movable in a cylinder 42 into which air under pressure may be admitted by any suitable control means through a hose such as shown at 43.

In order to maintain longitudinal control relationship between the cylinders 42, or more particularly the pistons 41 with the rocker unit, each bar 40 has one or more stub pins 44 adapted to enter properly located apertures provided for them in the bottom plate 10 of the unit (see Figs. 3–5). Furthermore, it will be noted that each bar 40 has a crowned top surface so that, even if one piston 42 should rise before the other, no damage will be done to the unit plate 10.

Each elevator cylinder is secured by bolts 46 to the horizontal portion 47' of a U-shaped tie bar or hanger 47 which extends laterally across the pit and has the upper ends of its vertical legs 47" indirectly secured to a pair of side channels 48 through the intervention of stub bars 49 held in place by bolts 50 each of which passes through the channel web 48 and the stub bar 49, and is threaded into the hanger 47". The organization just described as comprising the two U-shaped hangers 47 and the pair of side channels 48 with their stub bars 49 constitutes practically a cradle within which the rocker unit is free to move vertically as controlled by the elevators, and, to support this cradle in proper position relative to the pit, the latter is provided with guard plates 51 extending in parallelism longitudinally at both sides of the pit and having their upper edges 51' on level so that the cradle, as an entirety, may be supported by the edges 51' and moved along to any desired position relative to the pit mouth. The at present preferred construction of those supporting means is clearly shown in Figs. 1, 2 and 4, and comprises a hook-shaped member or plate 52 provided with a pair of wings 52a which are secured to the ends of the pair of stub bars 49 at one side of the pit, a similar member 52 being also provided for the cradle at the opposite side of the pit. The upper edge portion 53 of each plate 52 is formed to constitute a hook adapted to hang over the plate edge 51' and to be easily slid along the same to the desired location, both ends of the cradle being, of course, then moved simultaneously.

From the above, it will be understood that, by virtue of bolt-and-slot connection between the channel, stub bar and hanger 47, the cradle-length may be adjusted to conform to the exact width of the pit, or to the distance between its side rails 51, and thereafter remain in that condition while, at the same time, the entire device including the rocker unit may be removed from the pit when desired.

In Fig. 2, the side frames F of a car to be serviced are shown by dot-and-dash lines as still clearing the jacking devices which are illustrated in their low positions and of such height as to normally clear the low-slung type of car framing. In order to meet the height condition of the high-slung type of car framing, the shoes 37 are, as above-mentioned, removable to permit the substitution of a longer or higher nut 35a (see Fig. 9), but retaining the base parts of the jack.

In Figs. 7–8, there is shown a modification of the jacking supports, to handle high-slung car frames of extra widths, especially those of the large type of trucks. To meet those requirements, the jacks are supported on what may be called "outriggers," each preferably comprising a base plate 55 fitted between the strips 30 of the rocker unit, and slotted at 56 to receive a stationary stud 57 carrying a handled clamp nut 58 to hold the plate 55 against sliding displacement and at the same time to hold it down against tilting when the jack carries the load.

In this instance, the jack-supporting member, shown herein as an upper plate 59, is held in position on the base plate 55 by studs 60 of such length that the jack plate 59 will freely pass over the cradle hooks, so that the entire outrigger can be moved to bring the jacks into proper position under the side frames of the truck to be serviced, the rocker unit being shown in Fig. 8 in its "low" position.

Referring now again to the pivotal connection between the base plate 31 of the jacking member and the rocker plate 33 thereof (see Fig. 2) the pivot pin 32a is disposed at a right angle to the length direction of the rocker unit, so that the jacks may side-sway to the right or left from their vertical positions shown, the vertical positions of the jacks relative to the plane of the teeter being normally maintained by a pair of compression springs 61 disposed under tension at opposite sides of the pivot pin 32a. Therefore, it is obvious that, when the jack member is by some pressure swung from its normal position either to the right or to the left, one spring will be compressed while the other may expand, but the jack member will be returned to the normal vertical position when the pressure is released.

The particular object attained by the exemplary construction of the jacking member just described is an important feature of the present invention, because it eliminates certain hazards which its absence would entail, viz.: accidental displacement of the car during and by the operation of rocking the same, while being serviced.

It is economically advantageous that the rocking movement of the car should be accomplished speedily, and that the reversal of the rocking movement should take place quickly at the limit of such movement in either direction. Considering the weight of a car, and its consequent momentum resulting from speedy rocking movement, there is a considerable liability that the car may be subjected to bumping when the rocking movement is to be reversed, or that the car frames may slide sidewise on their jacks, whose tops are equipped with the side flanges 38 to keep the car frames from side-slipping. The force exerted by this rocking momentum becomes, therefore, a factor which may be detrimental to the jack, if it were a stiff fixture. Hence, the springs 61 are provided to permit a slight additional continued swaying movement of the car even should the rocking movement be abruptly stopped, such a momentary position being shown in Fig. 6, in which the jacks are illustrated as being in deflected condition slightly deviating from their normal perpendicular positions relative to the base plate 31.

While, primarily, the device of the present invention is intended to be used to rock the car for the purpose above set forth, it is also adapted to be used for lifting only the car axles, one at a time, so as to raise the wheels from the ground to permit their tires to be removed and replaced. In such a case, the frame-lifting jacks can be dispensed with, and a preferably pneumatically-operated axle raiser may be used, as shown in Fig. 10. Here, the rocker unit is down and inactive, and carries, in lieu of the two frame jacks, a single lifter 70 which may be sent onto the top of the rocker unit, either at one end thereof to lift only one end of the car axle with its wheel, or which may be placed substantially centrally on the unit to lift the entire axle bodily, and raise both of its ends and their wheels simultaneously from the ground.

In a manner similar to that of the jacking members above described, the lifter 70 has a contact shoe 71, which is vertically adjustable, to engage the underside of the axle by a screw sleeve 71a threaded in the tubular piston 72 when the latter is in its "down" position in a cylinder 73. Air under pressure is admitted into the interior of the cylinder through a valve controlled opening 74 and will then raise the axle, or whatever part the shoe 71 is in contact with, to any amount limited by the vertical movement of the piston in the cylinder, the full upward limit being illustrated in Fig. 10.

Then, if additional height or lift should be desired, the rocker unit may be bodily raised by the elevator mechanism above described, both ends simultaneously, without, however, setting the rocking mechanism into action.

In brief résumé of the functions performed by the mechanism of the present invention, it will be seen that these functions cover any and all contingencies which may arise in the manipulation of a car while it is being serviced, one factor especially being apparent when the oil in the crank case is to be renewed, because repeated and rapid rocking movement of the car from one side to the other will naturally produce a swashing movement of the oil in the casing, thus disturbing any sediment which may have accumulated there, and causing it to pass out of the casing when the latter is being drained. In some cases, the crank casing is to be washed out after the old oil has been drained from the casing, and the cleaning fluid (whatever it may be) then poured into the drained casing will; when the car is then again rocked, wash the parts clean and ready to receive fresh lubrication with a clean oil.

Furthermore, the device is well adapted for lifting the car for the purpose of permitting repairs and replacements of worn or broken parts or tires to be made without moving the car from its position over the pit. By virtue of its adaptability of adjustment to cars of different heights and widths, it is, in reality, universal in its use, and expeditious and thorough in action.

Variations and modifications may be made within the scope of this invention and portions of the improvements may be used without others.

I claim:

1. In a vehicle rocking device, a frame having pivoted thereon supporting members extending transversely of the vehicle to a position beneath the frame of said vehicle; vehicle frame-engaging means pivotally connected to the opposite ends of said supporting members and normally extending perpendicularly upward therefrom; means for pivotally moving the supporting members for rocking the vehicle, the pivotal connection of the frame-engaging means to the supporting members permitting the vehicle to sway an additional moment after the supporting members have reached the limit of their movement to prevent distortion to the frame of the vehicle; and means resisting movement of the frame-engaging means, the resistance of said means progressively increasing as the amplitude of movement of the frame-engaging means increases, said means returning the frame-engaging means to their normal position after the supporting members have reached the one limit of their movement and have started their return movement.

2. In a vehicle rocking device, a frame having pivoted thereon supporting members extending transversely of the vehicle to a position beneath the frame of said vehicle; vehicle frame-engaging jack means pivotally carried by the opposite ends of said supporting members; means for pivotally moving the supporting members for rocking the vehicle, the pivotal connection of the jack means to the supporting members permitting the jack means a pivotal movement in a plane transverse to the longitudinal axis of the vehicle; and shock-absorbing means associated with said jack means for limiting the pivotal movement of the jack means and absorbing the shock to the frame of the vehicle when the supporting members reach the opposite limits of their movements.

3. In a vehicle rocking device, a frame adapted to be disposed beneath a vehicle; a pair of elements transversely extending of the vehicle and having the adjacent ends pivoted to the frame; a vehicle frame-engaging jack disposed at the free end of each element; means for pivotally securing a jack to an end of each element; means for rocking the elements about their pivots so that one pivoted element moves upwardly as the other moves downwardly, and means for resiliently urging each jack to a position extending perpendicularly upward from each element, but permitting each jack a limited pivotal movement relative to its element as the elements are rocked about their pivots, said means including means disposed on opposite sides of each jack and alternately compressed as each jack pivots relative to its element.

4. In a vehicle rocking device, a frame adapted to be disposed beneath a vehicle; a pair of elements transversely extending of the vehicle and having the adjacent ends pivoted to the frame; a vehicle frame-engaging jack disposed at the free end of each element and normally extending perpendicularly upward therefrom; means for pivotally securing a jack to an end of each element; means for rocking the elements about their pivots so that one pivoted element moves upwardly as the other moves downwardly, the pivotal connection of each jack to its element permitting each jack to pivot after the elements have reached the limit of their movement thereby augmenting the sway of the vehicle as the elements are rocked about their pivots; and means for resiliently holding each jack against pivotal movement, the means limiting the pivotal movement of the jacks and returning the jacks to their normal position after the elements have reached the one limit of their movement and have started their return movement.

5. In a vehicle rocking device, a frame adapted to be disposed beneath a vehicle; a pair of elements transversely extending of the vehicle and having the adjacent ends pivoted to the frame; a vehicle frame-engaging jack disposed at the free end of each element; means for pivotally securing a jack to an end of each element; means for rocking the elements about their pivots so that one pivoted element moves upwardly as the other moves downwardly, the pivotal connection of each jack to its element permitting additional sway of said jacks individually as the elements are rocked about their pivots; and resilient means disposed on either side of each pivotal connection and normally holding each jack in a position extending substantially perpendicularly upward from its element, but permitting each jack a limited pivotal movement relative to its element.

6. In a vehicle rocking device, a frame adapted to be disposed beneath a vehicle; a pair of elements transversely extending of the vehicle and having the adjacent ends pivoted to the frame; a vehicle frame-engaging jack disposed at the free end of each element; means for pivotally securing a jack to an end of each element, each jack being individually adjustable vertically to contact the frame of a car to be serviced; means including a cam associated with each element for rocking the elements about their pivots so that one pivoted element moves upwardly as the other moves downwardly, the pivotal connection of each jack to its element augmenting the sway of the vehicle as the elements are rocked about their pivots; and means for normally holding said jacks in a position extending substantially perpendicularly upward from said elements, said means resisting the pivotal movement of said jacks, the resistance of said means to the pivotal movement of the jacks progressively increasing as the amplitude of movement of the jacks increases.

7. In a vehicle rocking device, a frame adapted to be disposed beneath a vehicle; suspension means carried by said frame for suspending the same within a vehicle greasing pit; a pair of elements transversely extending of the vehicle and having the adjacent ends pivoted to said frame; a vehicle frame-engaging jack disposed at the free end of each element, said jacks are individually vertically adjustable; means for pivotally securing each jack to the end of each element; means carried by said frame for rocking the elements about their pivots so that one pivoted element moves upwardly as the other moves downwardly; and resilient means for normally holding each jack in a position extending substantially perpendicularly upward from its element, but permitting each jack a limited pivotal movement as the elements are rocked about their pivots.

8. In a vehicle rocking device, a frame adapted to be disposed beneath a vehicle; suspension means carried by said frame for suspending the same within a vehicle greasing pit; a pair of elements transversely extending of the vehicle and having the adjacent ends pivoted to said frame, a vehicle frame-engaging jack disposed at the free end of each element; means for pivotally securing each jack to the end of each element; means carried by said frame for rocking the elements about their pivots so that one pivoted element moves upwardly as the other moves downwardly; resilient means for normally holding each jack in a position extending substantially perpendicularly upward from its element, but permitting each jack a limited pivotal movement as the elements are rocked about their pivots; and means carried by said frame and disposed beneath the same for vertically raising or lowering said frame relative to said vehicle greasing pit.

9. In a vehicle rocking device, a frame adapted to be disposed beneath the vehicle; a pair of elements transversely extending of the vehicle and having the adjacent ends pivoted to the frame; a vehicle frame-engaging jack disposed at the free end of each element; means for rocking the elements about their pivots so that one pivoted element moves upwardly and the other moves downwardly; and means for cushioning the shock to the vehicle frame at the extreme limits of the rocking movements, said means including a pivotal connection between each jack and its element, and resilient means urging each jack to a position extending perpendicularly upward from each element, but permitting each jack an additional rocking movement about its pivot at the limit of the rocking movement of the elements about their pivots.

10. In a vehicle rocking device, a frame adapted to be disposed beneath the vehicle; a pair of elements transversely extending of the vehicle and having adjacent ends pivoted to the frame; vehicle engaging jacks disposed at the free end of each element; means for pivotally securing a jack to an end of each element; means for rocking the elements about their pivots so that one element moves upwardly as the other moves downwardly; means for adjusting the distance between said jacks to bring them into vertical alignment with the side members of the frame of said vehicle; and means for normally holding each jack in a position extending substantially perpendicularly upward from its element, but permitting each jack when engaging the vehicle frame to move about its pivot when the pivoted elements are rocked and returning the jacks to their normal position after the elements have reached the one limit of their movement and have started their return movement.

11. In a vehicle rocking device, a frame adapted to be disposed beneath the vehicle; a pair of elements transversely extending of the vehicle and having adjacent ends pivoted to the frame; vehicle engaging jacks disposed at the free end of each element; means for pivotally securing a jack to an end of each element; means for rocking the elements about their pivots so that one element moves upwardly as the other moves downwardly; means for adjusting the distance between said jacks to bring them into vertical alignment with the side frames of said vehicle; means for vertically adjusting each jack independently of the other; means for vertically raising the entire device so that the wheel and axle assembly of the vehicle being serviced may be relieved of the weight of the vehicle; and means for resiliently holding each jack in a position extending substantially perpendicularly upward from its element, and resisting pivotal movement of each jack when the pivoted elements are rocked, the resistance of said means to pivotal movement of the jacks progressively increasing as the amplitude of movement of the jacks increases.

WILLIS A. SWAN.